United States Patent
Ohkubo et al.

(10) Patent No.: US 9,239,259 B2
(45) Date of Patent: Jan. 19, 2016

(54) OPTICAL MEASUREMENT SYSTEM, OPTICAL MEASUREMENT METHOD, AND MIRROR PLATE FOR OPTICAL MEASUREMENT SYSTEM

(75) Inventors: Kazuaki Ohkubo, Kusatsu (JP); Greg McKee, Sunapee, NH (US)

(73) Assignees: OTSUKA ELECTRONICS CO., LTD., Hirakata-Shi (JP); LABSPHERE, INC., North Sutton, NH (US)

( * ) Notice: Subject to any disclaimer, the term of this patent is extended or adjusted under 35 U.S.C. 154(b) by 132 days.

(21) Appl. No.: 14/000,872

(22) PCT Filed: Oct. 13, 2011

(86) PCT No.: PCT/JP2011/005731
§ 371 (c)(1),
(2), (4) Date: Aug. 22, 2013

(87) PCT Pub. No.: WO2013/054379
PCT Pub. Date: Apr. 18, 2013

(65) Prior Publication Data
US 2013/0327929 A1    Dec. 12, 2013

(51) Int. Cl.
*G01J 1/00* (2006.01)
*G01J 1/04* (2006.01)
*G01J 1/02* (2006.01)
*F21V 7/10* (2006.01)
*G01J 1/42* (2006.01)

(52) U.S. Cl.
CPC .............. *G01J 1/0407* (2013.01); *F21V 7/10* (2013.01); *G01J 1/0295* (2013.01); *G01J 1/42* (2013.01); *G01J 2001/0481* (2013.01); *G01J 2001/4247* (2013.01)

(58) Field of Classification Search
CPC .............. G01J 1/04; G01J 1/08; G01J 1/0295
USPC .......................................... 250/228; 356/236
See application file for complete search history.

(56) References Cited

U.S. PATENT DOCUMENTS

| 3,720,806 A | * | 3/1973 | Fotland ..................... 219/216 |
| 5,430,540 A | | 7/1995 | Ohkubo |
| 5,519,534 A | * | 5/1996 | Smith et al. ................ 359/599 |

(Continued)

FOREIGN PATENT DOCUMENTS

| CN | 101267974 | 10/2008 |
| CN | 101852648 | 10/2010 |

(Continued)

OTHER PUBLICATIONS

"Measuring Methods of White Light Emitting Diode for General Lighting", JIS C-8152, Jul. 20, 2007.

(Continued)

*Primary Examiner* — Thanh Luu
(74) *Attorney, Agent, or Firm* — Mori & Ward, LLP

(57) ABSTRACT

An optical measurement system includes an integrating sphere having a reflecting surface on its inner wall and having a first window. The optical measurement system further includes a support member for supporting a light source at a substantially central position of the integrating sphere, and a first baffle arranged on a line connecting the first window and the light source supported by the support member. The support member is connected, in a region opposite to the first window with respect to the light source, to the inner wall of the integrating sphere.

9 Claims, 13 Drawing Sheets

(56) References Cited

U.S. PATENT DOCUMENTS

| | | |
|---|---|---|
| 2007/0242264 A1 | 10/2007 | Ohkubo |
| 2008/0204884 A1 | 8/2008 | Jang |
| 2011/0205541 A1 | 8/2011 | Osawa et al. |
| 2011/0226961 A1 | 9/2011 | Osawa et al. |

FOREIGN PATENT DOCUMENTS

| | | |
|---|---|---|
| CN | 101915809 | 12/2010 |
| CN | 201955458 U | 8/2011 |
| CN | 102192786 | 9/2011 |
| CN | 102192832 | 9/2011 |
| JP | 06-167388 | 6/1994 |
| JP | 09-264781 | 10/1997 |
| JP | 2006-226749 | 8/2006 |
| JP | 2008-076126 | 4/2008 |
| JP | 2011-174785 | 9/2011 |
| WO | WO 2007/007947 | 1/2007 |
| WO | WO 2011/068281 | 6/2011 |

OTHER PUBLICATIONS

International Search Report for corresponding International Application No. PCT/JP2011/005731, Nov. 15, 2011.

Gaertner, "LED Measurement Issues", Retrieved from the Internet: URL:http://ghinstruments.com/wp-content/uploads/2013/04/R24_LED-MEASUREMENT-ISSUES_1-03_GH.pdf, Jan. 1, 2002, XP055178330, see NPL Cite No. 4.

Miller et al., "LED photometric calibrations at the National Institute of Standards and Technology and future measurement needs of LEDs", Proceedings of SPIE, Oct. 20, 2004, vol. 5530, pp. 69-79, XP055178335, see NPL Cite No. 4.

Ohno et al., "Analysis of Integrating Sphere Errors for Lamps Having Different Angular Intensity Distributions", Journal of the Illuminating Engineering Society, Jul. 1, 1997, vol. 26, No. 2, pp. 107-114, XP055178664, see NPL Cite No. 4.

Partial Supplementary European Search Report for corresponding EP Application No. 11873919.2-1562, Apr. 2, 2015.

Li et al., "Discussion on the Position of Light Emitting Diodes (LEDs) in the Total Flux Measurement with Integrating Sphere", Journal of Fudan University, Natural Science, Jun. 2007, pp. 356-359, 365(English abstract), vol. 46, No. 3, see Cite No. 11.

Chinese Office Action for corresponding CN Application No. 201180069806.0, May 27, 2015.

* cited by examiner

VALUE OF MEASURED
TOTAL LUMINOUS FLUX (A.U.)

(1) SPHERE PHOTOMETER φ40mm SUPPORT MEMBER
(2) SPHERE PHOTOMETER φ5mm SUPPORT MEMBER
(3) HEMISPHERE PHOTOMETER NO SUPPORT MEMBER

VALUE OF MEASURED
TOTAL LUMINOUS FLUX (A.U.)

(1) SPHERE PHOTOMETER φ40mm SUPPORT MEMBER
(2) SPHERE PHOTOMETER φ5mm SUPPORT MEMBER
(3) HEMISPHERE PHOTOMETER NO SUPPORT MEMBER

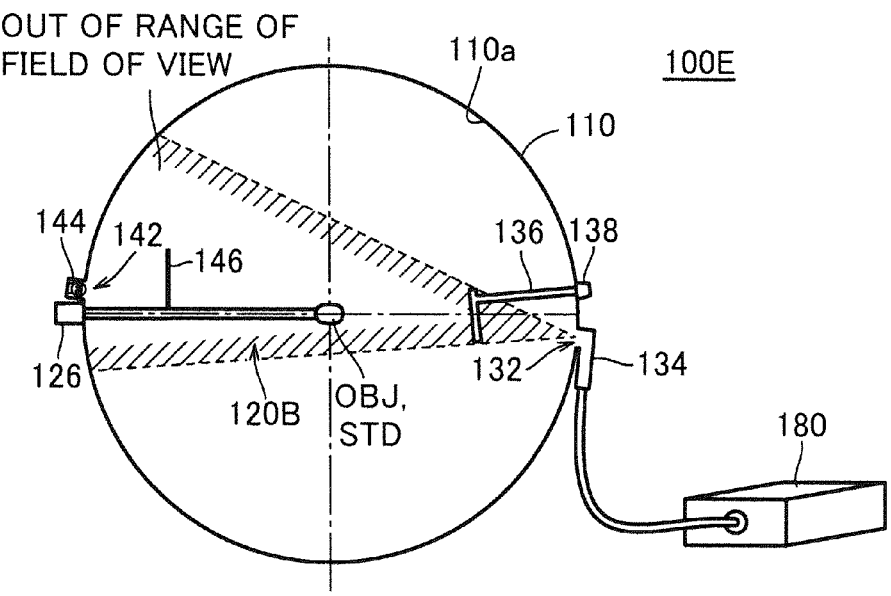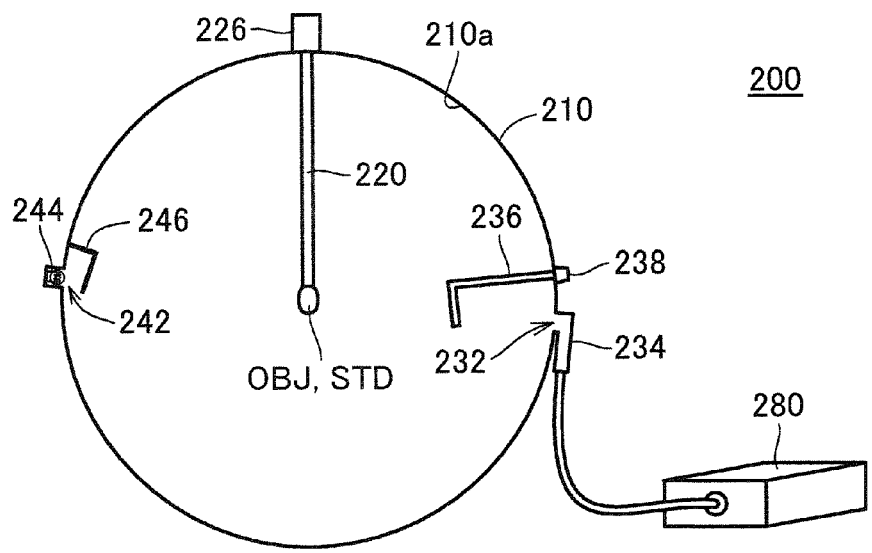

OPTICAL MEASUREMENT SYSTEM, OPTICAL MEASUREMENT METHOD, AND MIRROR PLATE FOR OPTICAL MEASUREMENT SYSTEM

TECHNICAL FIELD

The present invention relates to an optical measurement system, an optical measurement method, and a minor plate for an optical measurement system that are suitable for measurement for example of the total luminous flux emitted from a light source.

BACKGROUND ART

As a typical apparatus for measuring the total luminous flux emitted from a light source, a photometer including an integrating sphere is known. The integrating sphere has on its inner wall a reflecting surface formed by application of a diffuse reflecting material (such as barium sulfate or PTFE (polytetrafluoroethylene) for example). A light source to be measured (hereinafter also referred to as "sample light source") is lit in the state of being arranged in this integrating sphere. The luminous flux emitted from the light source is repeatedly reflected from the reflecting surface of the integrating sphere's inner wall and accordingly the illuminance on the integrating sphere's inner wall is made uniform. The fact that the illuminance which has thus been made uniform is proportional to the total luminous flux emitted from the light source is utilized to measure the total luminous flux of the light source. Since the total luminous flux measured by such a photometer is commonly a relative value, the value of the total luminous flux is compared with a detected value (standard value) obtained by using a known standard light source to thereby measure a calibrated value of the total luminous flux emitted from the sample light source.

The photometer including such an integrating sphere cannot avoid absorption of light by parts such as a support member used for arranging the light source in the integrating sphere and a light shielding plate (baffle) used for preventing the light from the light source from directly irradiating a photodetector. Further, the sample light source itself absorbs light.

In order to address such light absorption, Japanese Industrial Standards JIS C 8152: 2007, "Measuring Methods of White Light Emitting Diode (LED) for General Lighting," Jul. 20, 2007 (NPL 1) discloses that a factor for correcting for self absorption of a sample light source (self absorption correction factor) is used. This self absorption correction factor is calculated in the following manner. A light source for measuring self absorption (typically incandescent or tungsten halogen lamp) is provided in an integrating sphere. Under respective conditions that the sample light source is arranged in the integrating sphere and the sample light source is not arranged in the integrating sphere, the light source for measuring self absorption is lit. The values detected under respective conditions are compared with each other to thereby calculate the self absorption correction factor.

Further, with the purpose of avoiding influences of light absorption by the support member for example, a photometer including a hemispherical integrator (hereinafter also referred to as "integrating hemisphere") like the one disclosed in Japanese Patent Laying-Open No. 06-167388 (PTL 1) has been proposed (the photometer will also be referred to as "hemisphere photometer" hereinafter). This hemisphere photometer has, instead of the integrating sphere, an integrating hemisphere made up of a hemispherical portion having a reflecting surface formed on its inner wall and a circular mirror plate arranged so that its reflecting surface covers the opening of the hemispherical portion. A light source is disposed at the center of the mirror plate so that the center of the light source coincides with the center of curvature of the hemispherical portion.

In such a configuration, the light source and a virtual image of the light source generated by the minor plate are each present in an imaginary integrating sphere (a composite space made up of the real space in the hemispherical portion and the virtual image of the hemispherical portion). Namely, the hemisphere photometer enables the sample light source to be arranged in the imaginary integrating sphere without using the support member for supporting the light source. An error due to absorption of light by the support member for example can thus be reduced.

CITATION LIST

Patent Literature

PTL 1: Japanese Patent Laying-Open No. 06-167388

Non Patent Literature

NPL 1: Japanese Industrial Standards JIS C 8152: 2007, "Measuring Methods of White Light Emitting Diode (LED) for General Lighting," Jul. 20, 2007

SUMMARY OF INVENTION

Technical Problem

Recently, development for example of LED (Light Emitting Diode) light sources has been accompanied by the requirement of measurement of light sources having a luminous intensity distribution different from a luminous intensity distribution of a standard light source. The inventors of the present invention have newly found a novel technical problem that a measurement error arises due to the difference in luminous intensity distribution when such light sources are to be measured with an optical measurement apparatus including the conventional integrating sphere.

The inventors have also found a cause of the novel technical problem. According to the inventor's knowledge of the cause, when the hemisphere photometer as described above is used, a measurement error due to the difference in luminous intensity distribution is unlikely to occur. For various reasons, however, there may be a situation where one has no choice but to use the optical measurement apparatus including the conventional integrating sphere. Even in such a situation, there is the need to further enhance the measurement accuracy.

The present invention has been made to solve the above-described problem, and an object of the invention is to provide an optical measurement system, an optical measurement method, and a minor plate for an optical measurement system with the aim of reducing a measurement error due to the difference in the luminous intensity distribution between the standard light source and the sample light source.

Solution to Problem

An optical measurement system according to an aspect of the present invention includes an integrating sphere having a reflecting surface on an inner wall of the integrating sphere and having a first window. The optical measurement system further includes a support member for supporting a light source at a substantially central position of the integrating sphere, and a first baffle arranged on a line connecting the first window and the light source supported by the support member. The support member is connected, in a region opposite to the first window with respect to the light source, to the inner wall of the integrating sphere.

Preferably, the optical measurement system further includes a photodetector connected to the first window.

More preferably, the first baffle is arranged so that the support member is out of a range of a field of view through the first window of the photodetector.

Preferably, the integrating sphere has a second window formed at a position different from the first window, and light from an auxiliary light source is introduced into the integrating sphere through the second window. The optical measurement system further includes a second baffle associated with the light from the auxiliary light source introduced into the integrating sphere from the second window.

Preferably, the integrating sphere includes a first hemispherical portion and a second hemispherical portion coupled in such a manner that enables the first and second hemispherical portions to be opened and closed.

An optical measurement method according to another aspect of the present invention includes the steps of arranging a light source supported by a support member, at a substantially central position of an integrating sphere having a reflecting surface on an inner wall of the integrating sphere, and detecting light from the light source through a first window formed at the integrating sphere. A first baffle is arranged on a line connecting the first window and the light source supported by the support member, and the support member is connected, in a region opposite to the first window with respect to the light source, to the inner wall of the integrating sphere.

An optical measurement system according to still another aspect of the present invention includes: a first hemispherical portion and a second hemispherical portion having respective reflecting surfaces on respective inner walls and coupled in such a manner that enables the first and second hemispherical portions to be opened and closed; a first support member for lighting, in a state where the first and second hemispherical portions are closed, a light source at a substantially central position in a sphere formed by the first and second hemispherical portions; and a disk-shaped mirror plate attachable, in a state where the first and second hemispherical portions are opened, to cover an opening of the first hemispherical portion. The minor plate has a reflecting surface which is to face the first hemispherical portion. The optical measurement system further includes: a second support member for lighting, in a state where the mirror plate is attached to the first hemispherical portion, the light source exposed in a hemisphere formed by the first hemispherical portion and the minor plate; and a photodetector for detecting light from the light source through a window formed at the first hemispherical portion.

According to a further aspect of the present invention, a minor plate adapted to an optical measurement system is provided. The optical measurement system includes a first hemispherical portion and a second hemispherical portion having respective reflecting surfaces on respective inner walls and coupled in such a manner that enables the first and second hemispherical portions to be opened and closed. The mirror plate is attachable, in a state where the first and second hemispherical portions are opened, to cover an opening of the first hemispherical portion. The mirror plate includes: a reflecting surface which is to face the first hemispherical portion; and a support member for lighting, in a state where the mirror plate is attached to the first hemispherical portion, a light source exposed in a hemisphere formed by the first hemispherical portion and the mirror plate.

Advantageous Effects of Invention

The present invention can reduce a measurement error due to the difference in the luminous intensity distribution between the standard light source and the sample light source.

BRIEF DESCRIPTION OF DRAWINGS

FIG. 11 is a schematic diagram showing a configuration of an optical measurement system according to a fifth modification of the first embodiment.

FIG. 12A is a schematic diagram showing a configuration of an optical measurement system according to a second embodiment.

DESCRIPTION OF EMBODIMENTS

Figure 1A:
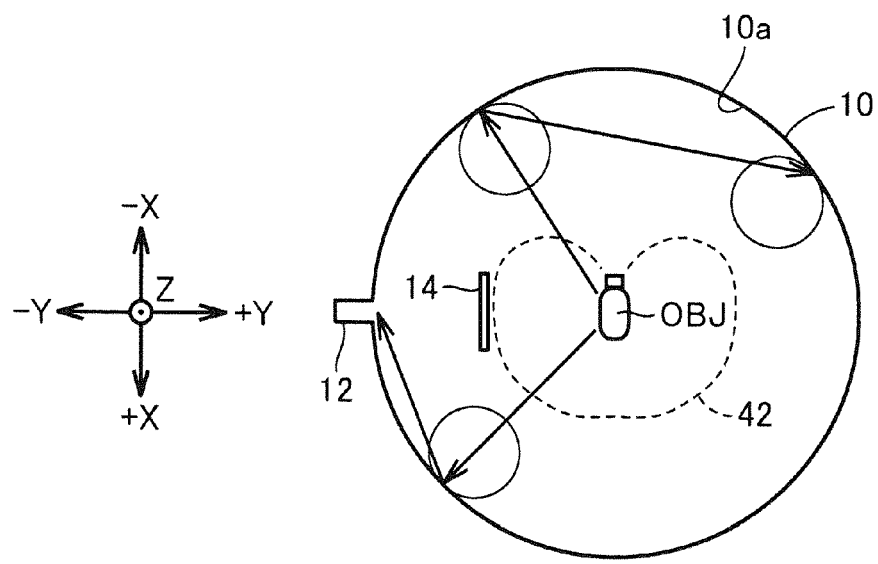
FIG. 1A is a diagram for illustrating a fundamental idea for measuring the total luminous flux emitted from a light source by means of an integrating sphere.

Embodiments of the present invention will be described in detail with reference to the drawings. In the drawings, the same or corresponding parts are denoted by the same reference characters, and a description thereof will not be repeated here.

A. Novel Technical Problem Found by the Inventors

The inventors of the present invention have found a novel technical problem that a measurement error arises when a light source is measured with a photometer including an integrating sphere and the light source has a luminous intensity distribution different from a luminous intensity distribution of a standard light source which is used for calibration. In the following, this novel technical problem will be described first.

Figure 1B:
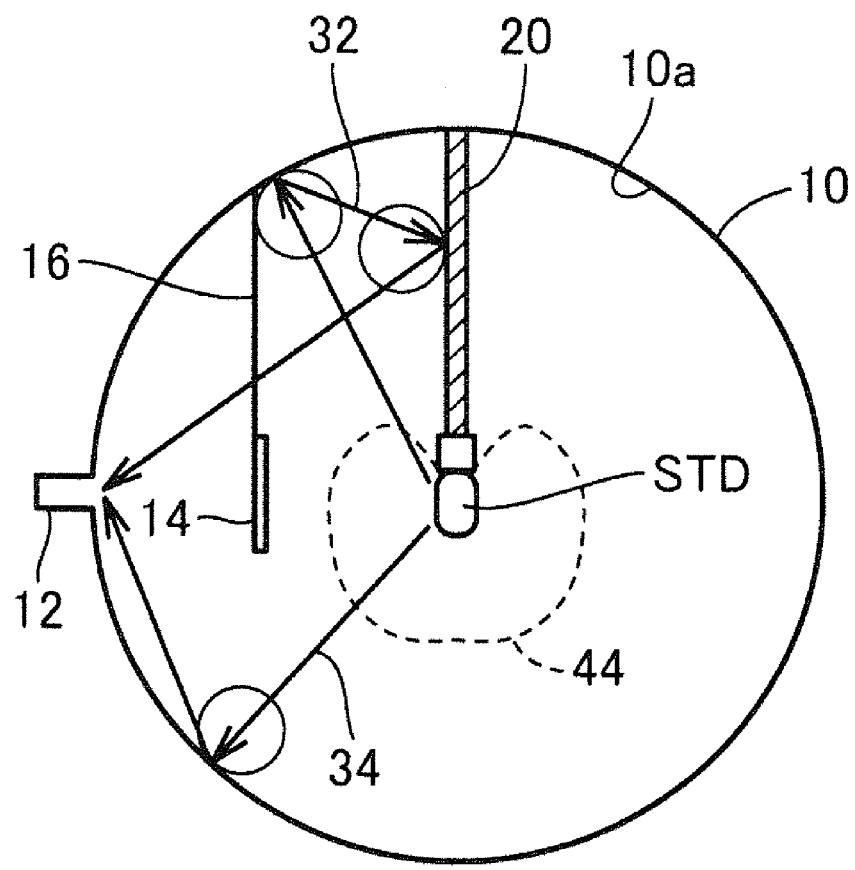
FIG. 1B is a diagram for illustrating a state where a standard light source is lit in the integrating sphere when calibration is performed.
Figure 1C:
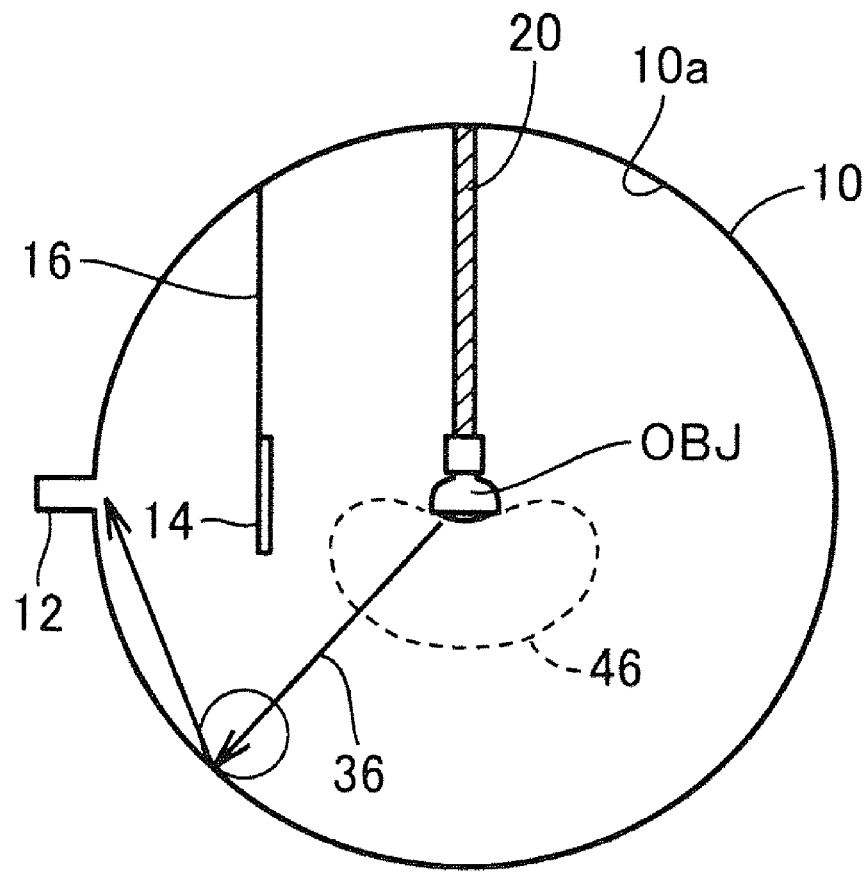
FIG. 1C is a diagram for illustrating a state where a sample light source is lit in the integrating sphere when measurement is performed.

FIG. 1A is a diagram for illustrating a fundamental idea for measuring the total luminous flux emitted from a light source by means of an integrating sphere. FIG. 1B is a diagram for illustrating a state where a standard light source is lit in the integrating sphere when calibration is performed. FIG. 1C is a diagram for illustrating a state where a light source to be measured (sample light source) is lit in the integrating sphere when measurement is performed.

Referring to FIG. 1A, a description will be given of the fundamental idea for measuring the total luminous flux emitted from a sample light source OBJ by means of an integrating sphere 10. As shown in FIG. 1A, at a central position of integrating sphere 10 having a reflecting surface 10a on its inner wall, sample light source OBJ is arranged, and sample light source OBJ is lit. Reflecting surface 10a is typically formed by application of a diffuse reflecting material (such as barium sulfate or PTFE (polytetrafluoroethylene) for example). By way of example, sample light source OBJ has a luminous intensity distribution indicated by a reference numeral 42.

The light (luminous flux) emitted from sample light source OBJ is repeatedly reflected from the inner wall of integrating sphere 10. Accordingly, the illuminance on the inner wall of integrating sphere 10 is made uniform which is represented by a value determined depending on the luminous flux emitted from sample light source OBJ. To integrating sphere 10, a photodetector 12 is optically connected through a window formed at any position. Photodetector 12 measures the illuminance which is made uniform on the inner wall of integrating sphere 10. The illuminance detected by this photodetector 12 indicates the magnitude of the total luminous flux emitted from sample light source OBJ.

It is noted that a baffle 14 is provided in integrating sphere 10 for preventing the light emitted from sample light source OBJ from directly irradiating photodetector 12. The surface of this baffle 14 is also a reflecting surface like the inner wall of integrating sphere 10. The light emitted from sample light source OBJ is thus reflected as well from the surface of baffle 14.

In the actual photometer, a support member is provided for holding, at a central position of integrating sphere 10, sample light source OBJ in the lit state. More specifically, as shown in FIG. 1B, a support member (lighting mount) 20 extending downward from the apex on the vertically upper side is arranged in integrating sphere 10, and the light source is arranged on the leading end of the support member. Baffle 14 is also positioned at a predetermined location in a certain way. In the example shown in FIG. 1B, baffle 14 is fixed by a support member 16 extending downward from above in the vertical direction, like support member 20.

FIG. 1B shows a state where the photometer is calibrated, in which standard light source STD is attached to the leading end of support member 20. It is supposed that standard light source STD has a luminous intensity distribution of 4 pi as indicated by a reference numeral 44. Namely, standard light source STD emits light in the main projecting direction (anterior direction) of standard light source STD and also emits light in the opposite direction (posterior direction) to the main projecting direction.

In contrast, FIG. 1C shows a state where the total luminous flux is measured, in which sample light source OBJ is attached to the leading end of support member 20. It is supposed that sample light source OBJ has a luminous intensity distribution of 2 pi as indicated by a reference numeral 46. Namely, sample light source OBJ emits light in only the main projecting direction (anterior direction) of sample light source OBJ, and no light is emitted in the opposite direction (posterior direction) to the main projecting direction. Sample light source OBJ having such a luminous intensity distribution of 2 pi is typically a light source using an LED or the like.

As shown in FIG. 1B, since standard light source STD has a luminous intensity distribution of 4 pi, the light emitted frontward of standard light source STD propagates in integrating sphere 10 along for example a path 34. Further, the light emitted rearward of standard light source STD propagates in integrating sphere 10 along for example a path 32. Namely, a part of the light emitted rearward of standard light source STD is primarily reflected from reflecting surface 10a of integrating sphere 10 to illuminate support member 20. A part of the light which illuminates support member 20 directly irradiates photodetector 12 without being blocked by baffle 14.

In contrast, as shown in FIG. 1C, since sample light source OBJ has a luminous intensity distribution of 2 pi, the light emitted from sample light source OBJ propagates in integrating sphere 10 along for example a path 36. No light is emitted rearward of sample light source OBJ. Therefore, in contrast to standard light source STD, no light is primarily reflected from reflecting surface 10a of integrating sphere 10 and thereafter directly irradiates photodetector 12. Namely, no component is reflected from support member 20 and thus no component is reflected from support member 20 to directly irradiate photodetector 12.

Of the light emitted from the standard light source, a component is reflected from support member 20 to directly irradiate photodetector 12. Depending on this component, the value of the measured total luminous flux is influenced. Namely, a component, which is a part of the light emitted from standard light source STD having a luminous intensity distribution of 4 pi, directly illuminates photodetector 12, while the component emitted from sample light source OBJ having a luminous intensity distribution of 2 pi does not directly illuminate photodetector 12.

Thus, the inventors of the present invention have found the fact that the difference in luminous intensity distribution between standard light source STD and sample light source OBJ has an influence on the result of measurement of the total luminous flux, as well as the arrangement that causes this as described above.

B. Hemisphere Photometer

The inventors of the present invention have conducted experiments as described later herein, for the above-described novel technical problem. In the experiments, the result of measurement performed using a hemisphere photometer was used as a comparative example. Therefore, the hemisphere photometer will briefly be described first.

Figure 2:
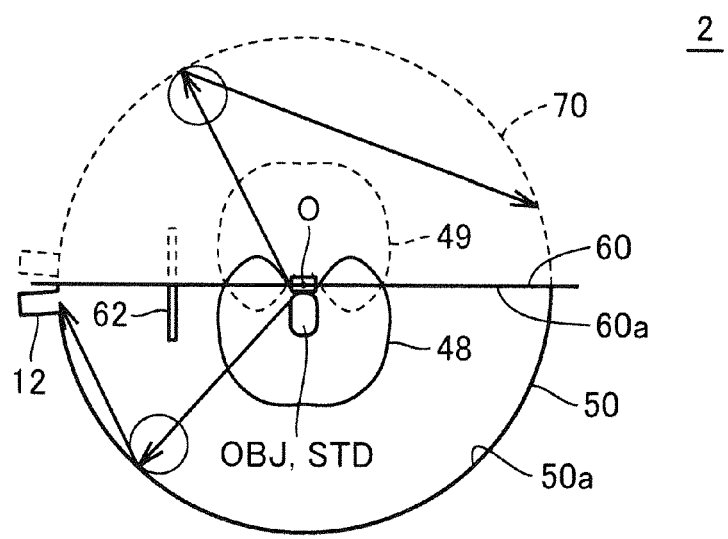
FIG. 2 is a schematic diagram showing an overview of a hemisphere photometer.

FIG. 2 is a schematic diagram showing an overview of a hemisphere photometer 2. Referring to FIG. 2, hemisphere photometer 2 employs a hemispherical integrator (integrating hemisphere) instead of integrating sphere 10 as shown in FIGS. 1A to 1C. More specifically, hemisphere photometer 2 includes a hemispherical portion 50 having a reflecting surface 50a formed on its inner wall, and a circular mirror plate 60 arranged so that its reflecting surface 60a covers the opening of hemispherical portion 50. A light source (standard light source STD or sample light source OBJ) is disposed at the center of minor plate 60 so that the center of the light source coincides with the center of curvature of the hemispherical portion.

As to reflecting surface 50a, typically a diffuse reflecting material (such as barium sulfate or PTFE for example) is applied to form the reflecting surface. Since it is necessary for reflecting surface 60a to cause specular reflection, reflecting surface 60a is configured using a metal-vapor-deposited minor (typically an aluminum-vapor-deposited mirror). In the hemisphere photometer, preferably reflecting surface 60a of minor plate 60 has a sufficiently high reflectance. In order to increase the reflectance, mirror plate 60 with reflecting surface 60a having undergone reflectance-enhancement processing may be employed.

Through a window formed at any position of hemispherical portion 50 in the vicinity of mirror plate 60, a photodetector 12 is optically connected.

In the case of hemisphere photometer 2 as shown in FIG. 2, a real image (luminous intensity distribution 48) of the light source and a virtual image (luminous intensity distribution 49) of the light source generated by mirror plate 60 (reflecting surface 60a) are each present in an imaginary integrating sphere (the composite space made up of the actual space in hemispherical portion 50 and virtual image 70 of the hemispherical portion). In other words, of the light source to be subjected to measurement (standard light source STD or sample light source OBJ), only the portion emitting the luminous flux (light emitting portion) appears to float in the imaginary integrating sphere together with the virtual image of the light emitting portion.

Thus, in the case of hemisphere photometer 2, the light source can be arranged in the imaginary integrating sphere without using the support member for supporting the light source. Namely, the support member for arranging the light source in the integrating sphere is present in the space outside the imaginary integrating sphere. Therefore, absorption of light and generation of a shadow by the support member can be avoided to thereby reduce the error.

Further, as for the hemisphere photometer, there is no influence due to the difference in luminous intensity distribution between standard light source STD and sample light source OBJ as described above.

C. Experimental Examples

In order to solve the above-described novel technical problem, the inventors of the present invention have measured the total luminous flux of sample light source OBJ, under respective conditions where support members different in diameter are arranged in the integrating sphere, respectively. Further, the result of measurement by a hemisphere photometer which can avoid absorption of light and generation of a shadow by the support member was used as a comparative example. The results of measurement were evaluated.

c1: Experimental Example 1

The following three different photometers were prepared and measurements of the total luminous flux were taken by them respectively. As sample light source OBJ, a 13 W bulb-type fluorescent lamp (Osram Sylvania Inc. in the U.S., Model No. CF13EL) was used.
—Measurement Condition 1—
integrating sphere (diameter of inner wall: 40 inches (about 1 m)
diameter of support member: 40 mm
—Measurement Condition 2—
integrating sphere (diameter of inner wall: 40 inches (about 1 m)
diameter of support member: 5 mm
—Measurement Condition 3—
integrating hemisphere (diameter of inner wall of hemispherical portion: 40 inches (about 1 m)
It is noted that Model No. LMS-400 of Labsphere, Inc. in the U.S. was used as the integrating sphere, and Model No. HM-400 of Labsphere, Inc. in the U.S. was used as the integrating hemisphere.

As for the method for measurement, a standard light source was used first to calibrate the photometers each and thereafter the total luminous flux of sample light source OBJ was measured.

Figure 3:
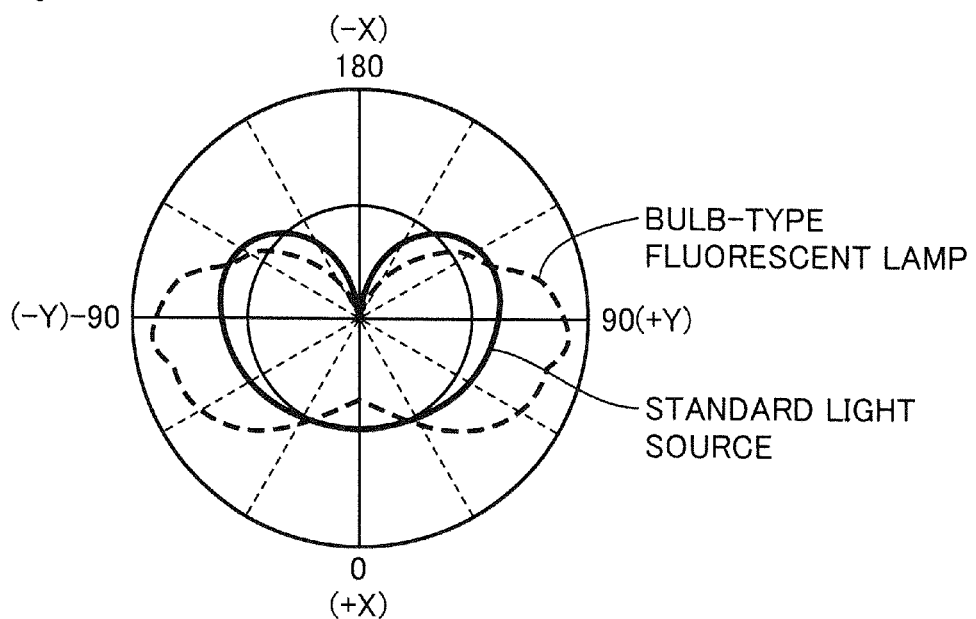
FIG. 3 is a diagram showing a difference in luminous intensity distribution between a standard light source and a bulb-type fluorescent lamp used for experiments.
Figure 4A:
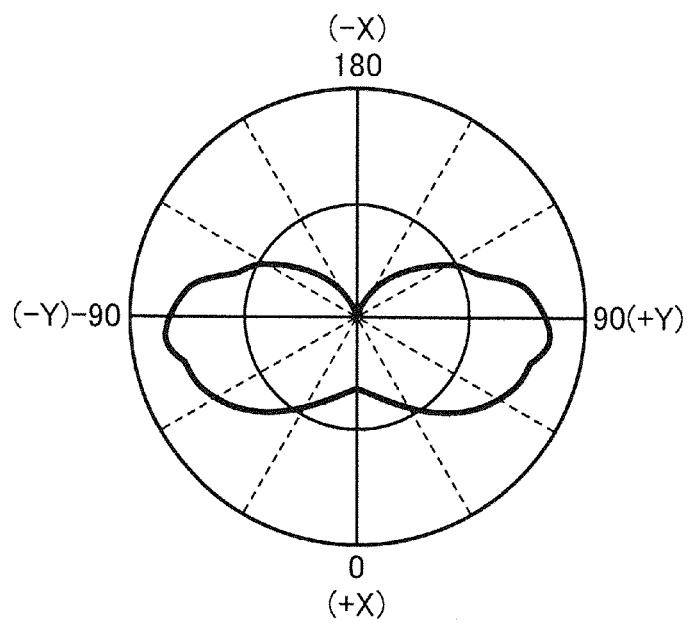
FIG. 4A is a diagram showing details of Experimental Example 1.
Figure 4B:
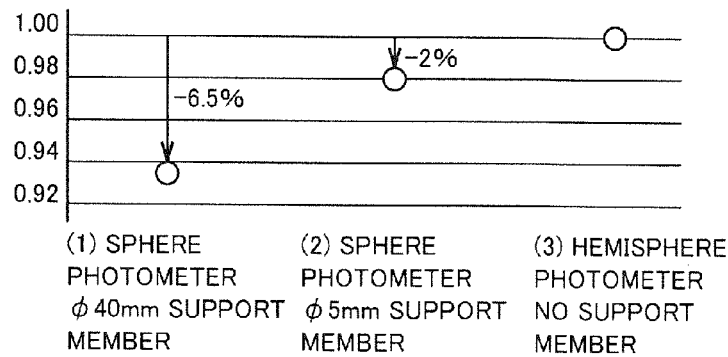
FIG. 4B is a diagram showing details of Experimental Example 1.

FIG. 3 is a diagram showing a difference in luminous intensity distribution between the standard light source and the bulb-type fluorescent lamp used for the experiments. FIGS. 4A and 4B are diagrams showing details of Experimental Example 1. In FIG. 4B, respective results (magnitudes of the total luminous flux) of measurement under Measurement Conditions 1 to 3 that are standardized based on the result of measurement under Measurement Condition 3 are shown.

As shown in FIG. 3, the luminous intensity distribution of the bulb-type fluorescent lamp which is sample light source OBJ extends laterally to a greater extent than the luminous intensity distribution of standard light source STD, and rearward emission of the bulb-type fluorescent lamp is less than that of standard light source STD. The bulb-type fluorescent lamp and the standard light source are therefore greatly different in luminous intensity distribution.

It is seen as shown in FIG. 4B that, while the same sample light source OBJ was measured, the results of measurement using the integrating sphere which has the same diameter and reflection coating (Measurement Conditions 1 and 2) each indicate a lower total luminous flux than the result of measurement using the integrating hemisphere (Measurement Condition 3). Further, a thicker support member and a higher surface reflectance result in a lower value of the measured total luminous flux. Namely, the result of measurement under Measurement Condition 1 is different by 6.5% from the result of measurement under Measurement Condition 3 (directional), and the result of measurement under Measurement Condition 2 (omnidirectional) is different by −2% from the result of measurement under Measurement Condition 3.

In the case of the integrating hemisphere, no support member is present in the integrating sphere because of the principle of the integrating hemisphere. It is thus seen from the results shown in FIG. 4B that the measured value is influenced by the size of the support member arranged in the integrating sphere. When the value measured using the integrating hemisphere having no support member present in the integrating sphere is used as a reference, the result of measurement using the integrating sphere of the same inner diameter may be lower by 5% or more in certain circumstances.

c2: Experimental Example 2

Further, for an LED bulb having its light intensity distribution different more greatly from that of the standard light source, the inventors have also conducted similar experiments under above-described Measurement Conditions 1 to 3. In Experimental Example 2, an LED bulb (General Electric Company in the U.S., Model No. Par20, beam angle 20 degrees) was used as the sample light source.

Figure 5A:
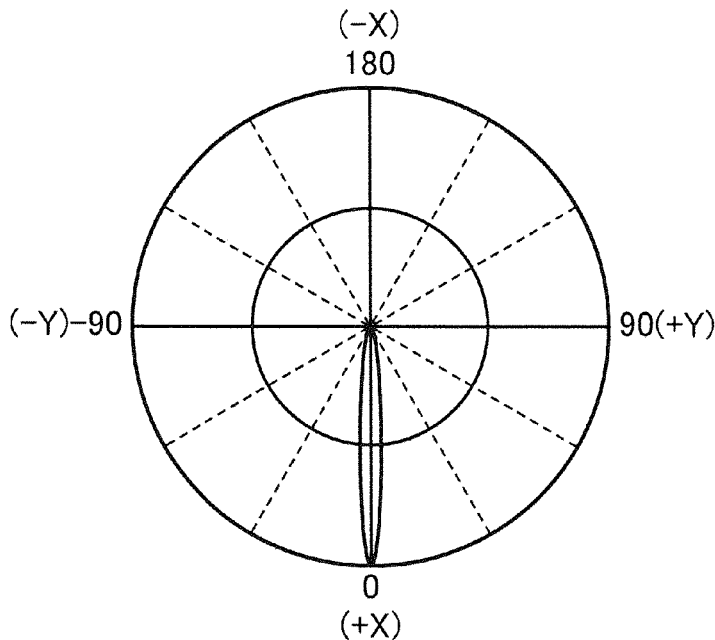
FIG. 5A is a diagram showing details of Experimental Example 2.
Figure 5B:
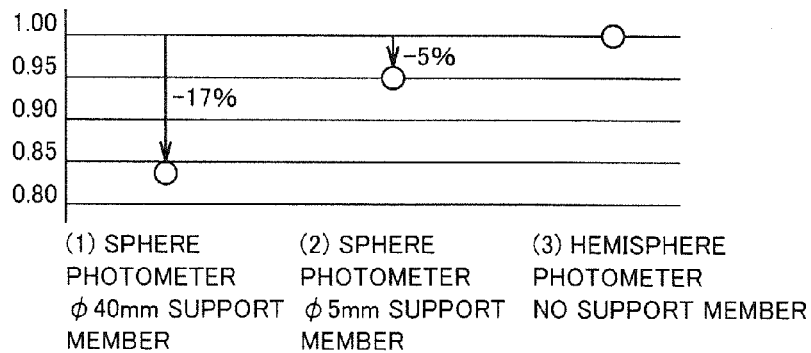
FIG. 5B is a diagram showing details of Experimental Example 2.

FIGS. 5A and 5B are diagrams showing details of Experimental Example 2. In FIG. 5B, respective results (magnitudes of the total luminous flux) of measurement under Measurement Conditions 1 to 3 that are standardized based on the result of measurement under Measurement Condition 3 are shown.

As shown in FIG. 5A, the LED bulb is configured to emit a luminous flux in a narrow range located forward of the bulb, and its luminous intensity distribution is greatly different from that of standard light source STD. Namely, it is seen that the luminous intensity distribution of the LED bulb is present forward in a range of approximately 10 degrees to +10 degrees only, and most of the generated luminous flux is emitted within a narrow range like a spot.

Referring to FIG. 5B, it is seen that, in the case where a sample light source having its luminous intensity distribution greatly different from that of standard light source STD is used, the errors relative to the result of measurement using the integrating hemisphere are greater. Namely, it is seen that a greater difference in luminous intensity distribution between standard light source STD and sample light source OBJ results in a further smaller total luminous flux measured using the integrating sphere.

More specifically, the result of measurement under Measurement Condition 2 is different by −5% from the result of measurement under Measurement Condition 3, and the result of measurement under Measurement Condition 1 is different by −17% from the result of measurement under Measurement Condition 3. Thus, in the case where the value measured using the integrating hemisphere in which no support member is present in the integrating sphere is used as a reference and an integrating sphere having the same inner diameter as the integrating hemisphere is used, the result of measurement using the integrating sphere may be lower than the reference by 15% or more in certain circumstances.

In the following, a description will be given of examples of the configuration that enable more accurate measurement even if sample light source OBJ has a luminous intensity distribution different from that of standard light source STD.

D. First Embodiment

As described above, an error due to a difference in luminous intensity distribution between standard light source STD and sample light source OBJ is considered as being caused by reflection from the surface of the support member. A first embodiment therefore adopts a solution of determining the shape of the support member and the position where the support member is to be arranged, so that the support member is out of the range of the field of view of the photodetector in an optical measurement apparatus using an integrating sphere.

d1: Basic Configuration

Figure 6A:
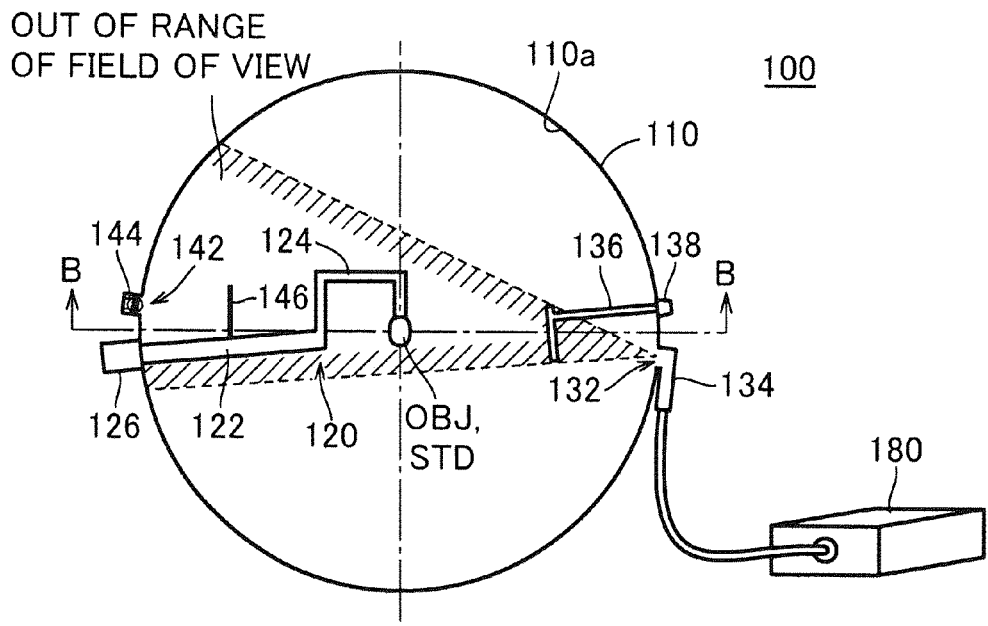
FIG. 6A is a schematic diagram showing a configuration of an optical measurement system according to a first embodiment.
Figure 6B:
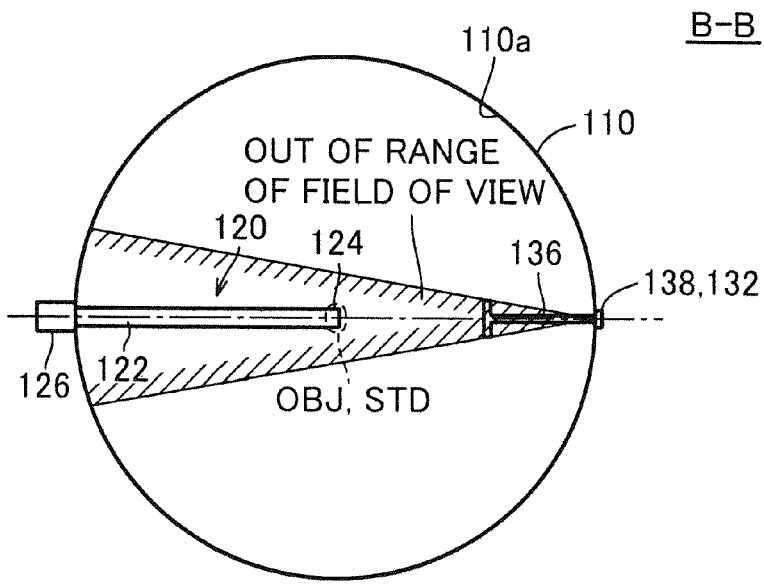
FIG. 6B is a schematic diagram showing the configuration of the optical measurement system according to the first embodiment.
Figure 6C:
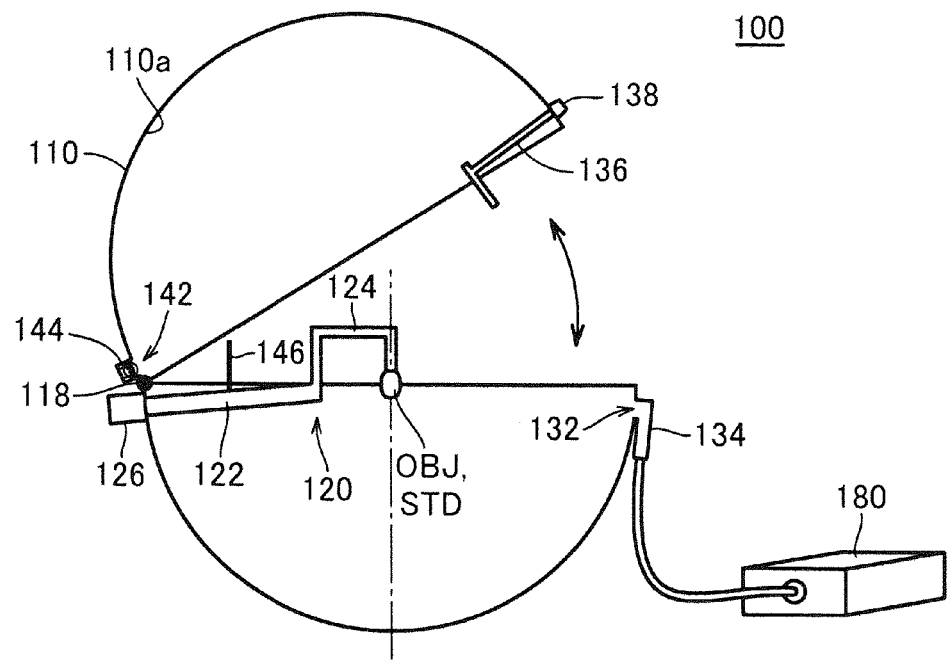
FIG. 6C is a schematic diagram showing the configuration of the optical measurement system according to the first embodiment.

FIGS. 6A to 6C are each a schematic diagram showing a configuration of an optical measurement system 100 according to the first embodiment. Referring to FIG. 6A, optical measurement system 100 includes an integrating sphere 110, a support member 120, a baffle 136, and a photodetector 180.

Integrating sphere 110 has a reflecting surface 110a on its inner wall. This reflecting surface 110a is a diffuse reflecting surface formed by application of barium sulfate, PTFE or the like. When a measurement is to be taken, a light source (standard light source STD or sample light source OBJ) is arranged at a substantially central position of integrating sphere 110. Namely, support member 120 supports the light source at a substantially central position of integrating sphere 110. Here, "substantially central position" is a concept including the physically central position of integrating sphere 110 and a surrounding area of the physically central position, and the surrounding area includes a range away from the central position to such an extent that does not substantially influence the accuracy of measurement of the light source.

Support member 120 includes a first member 122, a second member 124 coupled to first member 122, and a fixing member 126 for fixing first member 122 to integrating sphere 110. Respective shapes and positions where these members are arranged will be detailed later herein.

Integrating sphere 110 has an observation window 132 formed through the inner surface and the outer surface of integrating sphere 110. Photodetector 180 is connected to observation window 132 through an optical fiber 134 processed to be adapted to attachment. Accordingly, photodetector 180 can detect the average luminance from the inner wall of integrating sphere 110.

Photodetector 180 can detect the illuminance at the observation window 132 of integrating sphere 110 and calculate the total luminous flux of sample light source OBJ. Photodetector 180 may be configured to detect the illuminance for at least a certain range of wavelength or to detect the relative illuminance spectrum. Photodetector 180 may be a spectrally corrected photodiode or a spectrometer with a diffraction grating, a line sensor optically associated with the diffraction grating and the like. Photodetector 180 may have a near cosine response to collect the average radiance from all visible areas on the inner wall of integrating sphere 110. Such a photodetector 180 capable of spectrometry can be employed to further perform evaluation of the essential performance of the light source such as chromaticity, correlated color temperature and color rendering, in addition to the total luminous flux.

In front of observation window 132, baffle 136 is arranged for preventing light from directly irradiating photodetector 180. Baffle 136 is fixed to integrating sphere 110 by a fixing member 138. More specifically, baffle 136 is arranged on a line connecting observation window 132 and the light source (standard light source STD or sample light source OBJ) supported by support member 120. In this way, the light (luminous flux) emitted from the light source is prevented from partially directly irradiating observation window 132

(namely before the light is repeatedly reflected from the inner wall of integrating sphere 110), and an error in measurement is reduced.

In optical measurement system 100 according to the present embodiment, baffle 136 also performs a function of preventing support member 120 from being included in the range of the field of view, through observation window 132, of photodetector 180. Namely, baffle 136 is sized so that support member 120 is in the shade of baffle 136 when photodetector 180 collects the average radiance from the inner wall of integrating sphere 110 through observation window 132.

In order to hide support member 120 in the shade of baffle 136 as viewed from observation window 132, it is necessary to appropriately determine the shape of support member 120 and the position where support member 120 is to be arranged, as well as the size of baffle 136 for example. It is also necessary to give consideration to deterioration of the accuracy in measurement due to self absorption of support member 120 and baffle 136, and thus these are preferably as small as possible.

Accordingly, in optical measurement system 100 according to the present embodiment, support member 120 is configured to be arranged at a position (direction) close to the position where the light source is arranged, when the inside of integrating sphere 110 is seen from photodetector 180 through observation window 132. More specifically, support member 120 configured to be connected, in a region opposite to observation window 132 with respect to the light source, to the inner wall of integrating sphere 110, is employed. In other words, support member 120 is arranged within the range of the field of view which is shielded by baffle 136 provided for preventing the light from the light source from directly irradiating photodetector 180. Based on this idea, support member 120 may assume any shape. FIG. 6A shows a typical example of the shape, in which the most part of support member 120 is located in the vicinity of the line (optical axis) passing through the light source.

More specifically, support member 120 includes first member 122 connected, in a region opposite to observation window 132 with respect to the light source, to the inner wall of integrating sphere 110. Regarding sample light source OBJ, the light source is often of the type attached to the ceiling. In this case, sample light source OBJ is secured to the vertically upper side so that the light irradiates vertically downward. Therefore, of support member 120 shown in FIG. 6A, L or C-shaped second member 124 which is used for securing sample light source OBJ to the vertically upper side is connected to the leading end of first member 122.

In first member 122 and second member 124, a power supply line or the like for lighting the light source is contained. Further, on respective surfaces of first member 122 and second member 124, respective reflecting surfaces are chosen to minimize absorption of light. The reflecting surface may be a diffuse reflecting surface or specular reflection surface, in view of the principle of the reflecting surface. For ease of processing, a diffuse reflecting surface formed by application of barium sulfate, PTFE or the like is commonly employed.

FIG. 6B schematically shows a cross section along B-B shown in FIG. 6A. As shown in FIG. 6B, in the cross section including the central position of integrating sphere 110, observation window 132, baffle 136, the light source, and support member 120 are arranged on a substantially straight line. In this way, support member 120 can be excluded from the range of the field of view of photodetector 180, without increasing the size of baffle 136.

Further, in order to correct for self absorption of the sample light source, an auxiliary lamp may be provided. More specifically, as shown in FIG. 6A, integrating sphere 110 has an auxiliary light source window 142 formed at a position different from observation window 132. In auxiliary light source window 142, an auxiliary light source 144 associated with the auxiliary light source window is arranged. Light from auxiliary light source 144 is introduced through auxiliary light source window 142 into integrating sphere 110.

Regarding the light emitted from this auxiliary light source 144 as well, the light has to be prevented from directly irradiating photodetector 180. Therefore, a baffle 146 associated with the light from auxiliary light source 144 that is introduced from auxiliary light source window 142 into integrating sphere 110 is arranged. This baffle 146 also has a reflecting surface formed on its surface like baffle 136. Baffle 146 may be configured to have any shape and to be provided at any position as long as the light from auxiliary light source window 142 is prevented from directly irradiating photodetector 180.

As for the way to correct for self absorption of standard light source STD and sample light source OBJ by means of auxiliary light source 144, a description will be given later herein.

Support member 120 as described above and associated components can be employed to reduce an error in measurement, even if standard light source STD and sample light source OBJ greatly differ from each other in luminous intensity distribution are used. As described above, as long as the light from the light source can be prevented from directly irradiating photodetector 180 after being reflected from support member 120, an influence of the luminous intensity distribution on the accuracy of measurement can be reduced. Therefore, any shape other than the shape shown in FIG. 6A may be employed as long as it conforms to the above-described technical idea. Examples of the other shape will be described later herein.

As described above, in optical measurement system 100, standard light source STD is attached to support member 120 when calibration is to be performed, and sample light source OBJ is attached to support member 120 when measurement is to be performed. A configuration that enables a user to easily replace the light source is therefore preferred. In the first embodiment, integrating sphere 110 is constituted of a pair of hemispherical portions and these hemispherical portions are coupled in such a manner that enables the hemispherical portions to be opened and closed. Such a configuration can be employed to enable a user to easily access support member 120 even if integrating sphere 110 has a larger inner diameter.

As shown in FIG. 6C, by way of example, integrating sphere 110 is constituted of an upper hemispherical portion arranged on the vertically upper side and a lower hemispherical portion arranged on the vertically lower side. The upper hemispherical portion and the lower hemispherical portion are coupled by a hinge 118 so that they can be opened and closed. The upper hemispherical portion is moved vertically upward to thereby open integrating sphere 110.

d2: First Modification

As described above, for the baffle associated with the light from auxiliary light source 144 that is introduced from auxiliary light source window 142 into integrating sphere 110, any shape of the baffle and any position at which the baffle is to be arranged may be employed.

Figure 7:
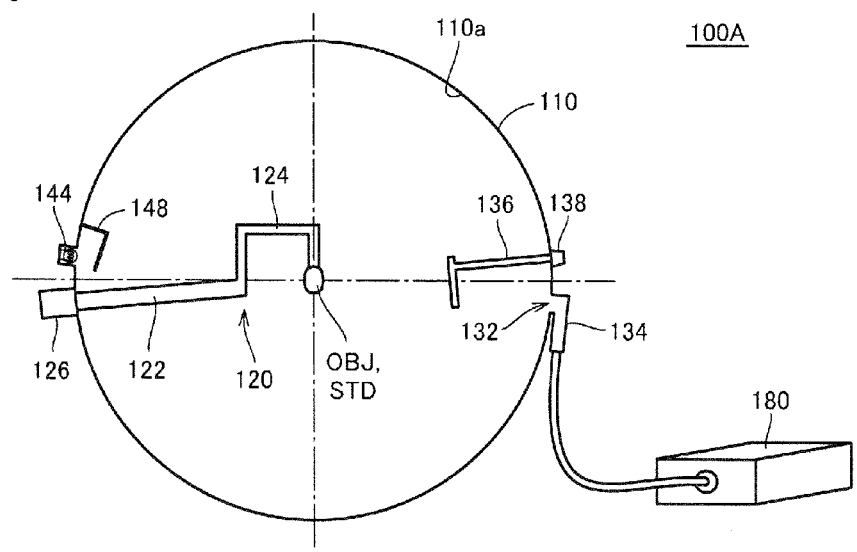
FIG. 7 is a schematic diagram showing a configuration of an optical measurement system according to a first modification of the first embodiment.

FIG. 7 is a schematic diagram showing a configuration of an optical measurement system 100A according to a first modification of the first embodiment. In optical measurement system 100A shown in FIG. 7, a baffle 148 associated with the light from auxiliary light source 144 is fixed to the inner wall of integrating sphere 110, instead of support member 120.

In the case where the configuration as shown in FIG. 7 is employed, it is also possible to detach support member 120 from integrating sphere 110 independently of auxiliary light source 144. Therefore, the same integrating sphere 110 can be used to measure the total luminous flux of sample light source OBJ following the method of the present embodiment (the method using support member 120 as shown in FIG. 6A to 6C) and also measure the total luminous flux of sample light source OBJ following the conventional method.

d3: Second Modification

As described above, in the case where integrating sphere 110 is constituted of a pair of hemispherical portions which are coupled so that they can be opened and closed, respective positions of support member 120 and hinge 118 relative to each other can be determined independently. Therefore, a configuration that enables a user to replace the light source more easily may also be employed.

Figure 8:
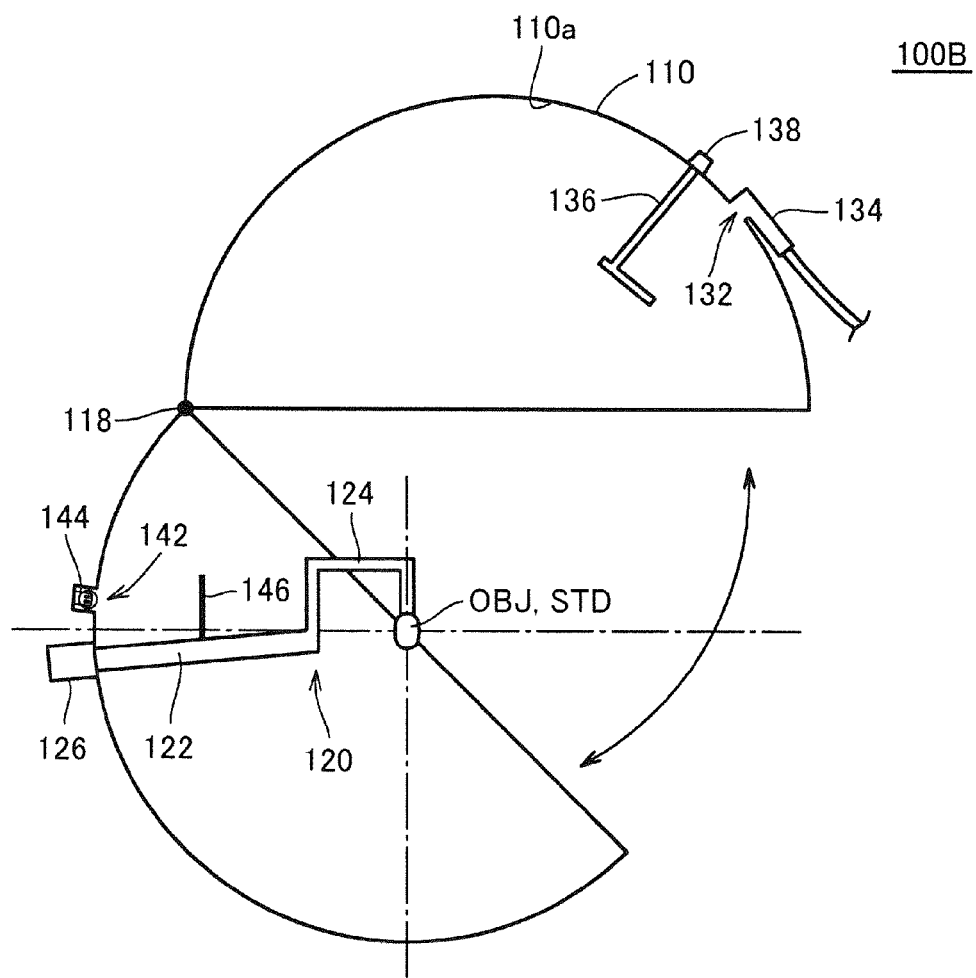
FIG. 8 is a schematic diagram showing a configuration of an optical measurement system according to a second modification of the first embodiment.

FIG. 8 is a schematic diagram showing a configuration of an optical measurement system 100B according to a second modification of the first embodiment. In optical measurement system 100B shown in FIG. 8, hinge 118 is provided at a higher position than the position where support member 120 is connected to integrating sphere 110. While employment of such a configuration heightens the position of the uppermost part of integrating sphere 110 in the opened state, a user can advance closer to support member 120.

The light source can therefore be replaced in a shorter time for calibration and for measurement to be performed.

d4: Third Modification

Instead of the above-described combination of two hemispherical portions of the same shape, integrating sphere 110 may be configured to be partially openable.

Figure 9:
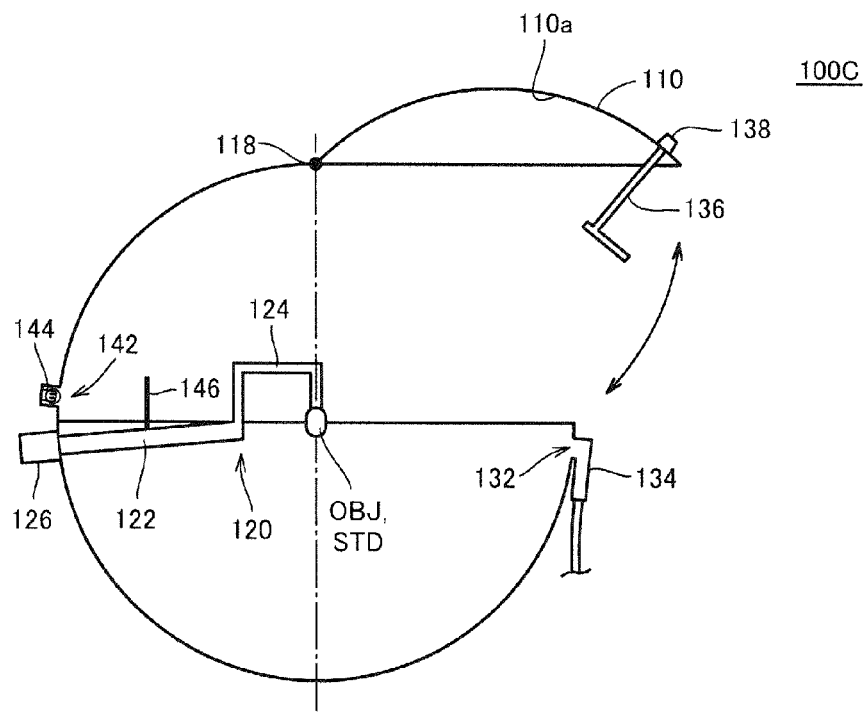
FIG. 9 is a schematic diagram showing a configuration of an optical measurement system according to a third modification of the first embodiment.

FIG. 9 is a schematic diagram showing a configuration of an optical measurement system 100C according to a third modification of the first embodiment. In optical measurement system 100C shown in FIG. 9, a part (approximately one-fourth of the whole for example) of integrating sphere 110 can be opened and closed by hinge 118.

By this configuration, the position of the uppermost part of integrating sphere 110 in the opened state can be kept low. Therefore, even if the upward clearance is limited in the place where integrating sphere 110 is installed, an optical measurement system including integrating sphere 110 having a relatively large inner diameter can be used.

d5: Fourth Modification

As described above, as the shape of the support member, any shape can be employed as long as the support member is out of the range of the field of view of photodetector 180.

Figure 10:
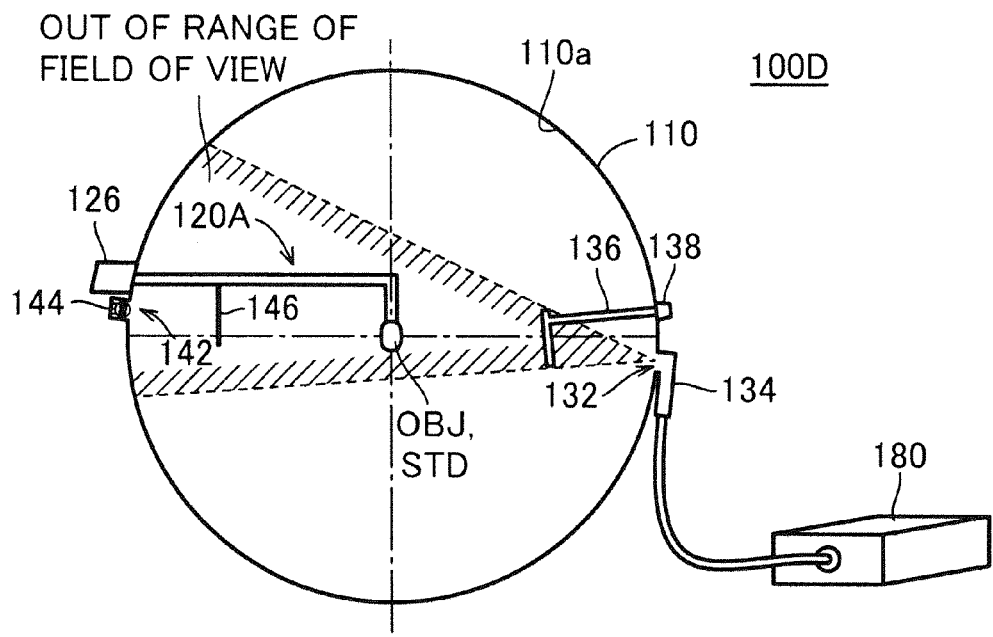
FIG. 10 is a schematic diagram showing a configuration of an optical measurement system according to a fourth modification of the first embodiment.

FIG. 10 is a schematic diagram showing a configuration of an optical measurement system 100D according to a fourth modification of the first embodiment. In optical measurement system 100D shown in FIG. 10, an L-shaped support member 120A is used. This support member 120A is connected, in a region opposite to observation window 132 with respect to the light source, to the inner wall of integrating sphere 110, and support member 120A is entirely located out of the range of the field of view of photodetector 180.

Such a support member 120A can be employed to further simplify the structure thereof.

d6: Fifth Modification

Further, in the case where a sample light source OBJ that emits light in the horizontal direction is to be measured, the following configuration may be employed.

FIG. 11 is a schematic diagram showing a configuration of an optical measurement system 100E according to a fifth embodiment of the first embodiment. In optical measurement system 100E shown in FIG. 11, a substantially linear support member 120B is used. This support member 120B extends, in a region opposite to observation window 132, along a straight line passing through the light source. Namely, support member 120B is connected, in a region opposite to observation window 132 with respect to the light source, to the inner wall of integrating sphere 110, and support member 120B is entirely located out of the range of the field of view of photodetector 180.

Such a support member 120B is suitable for measurement of sample light source OBJ emitting light in the horizontal direction.

d7: Other Modifications

Instead of the configuration as shown in FIG. 6C of integrating sphere 110 which is divided along a horizontal plane into two sections, a configuration of integrating sphere 110 which is divided along a vertical plane into two sections may also be employed. It should be considered here that, depending on the luminous intensity distribution of sample light source OBJ, the light emitted from the light source may be concentrated on the joint area between the two hemispherical portions. In such a case, it is preferable to change the direction in which sample light source OBJ is oriented for example to a more suitable direction.

Further, integrating sphere 110 may be made up of three or more parts.

Furthermore, in the case where integrating sphere 110 is made up of multiple parts, the position(s) of the joint(s) between the parts is (are) appropriately designed depending on the use, the place of installation, and the like. Therefore, hinge 118 for example is not limited to the above-described positions as shown in FIG. 6C and FIG. 8, but may be provided at any position.

d8: Advantages

In accordance with the above-described first embodiment, the support member which is connected, in a region opposite to observation window 132 with respect to the light source, to the inner wall of integrating sphere 110 can be employed to thereby measure optical characteristics such as the total luminous flux with a higher accuracy, even if standard light source STD and sample light source OBJ are greatly different from each other in terms of the luminous intensity distribution.

Further, in accordance with the first embodiment, integrating sphere 110 can be constituted of any number of multiple parts, and thus an appropriate optical measurement system can be implemented depending on the use, the place of installation, and the like.

E. Second Embodiment

As described above, in the case where the hemisphere photometer is employed, the measurement error due to a difference in luminous intensity distribution between standard light source STD and sample light source OBJ does not occur. Actually, however, it may often be the case that the hemisphere photometer cannot be newly introduced for financial reasons for example. Accordingly, a second embodiment employs a configuration for implementing a hemisphere photometer using an optical measurement apparatus including an existing integrating sphere.

e1: Basic Configuration

Figure 12B:
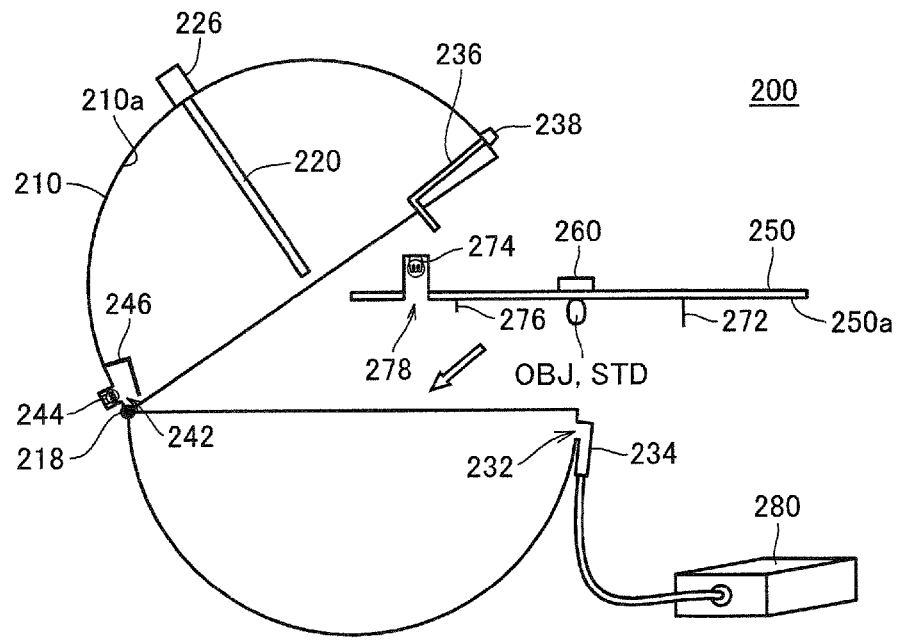
FIG. 12B is a schematic diagram showing the configuration of the optical measurement system according to the second embodiment.
Figure 12C:
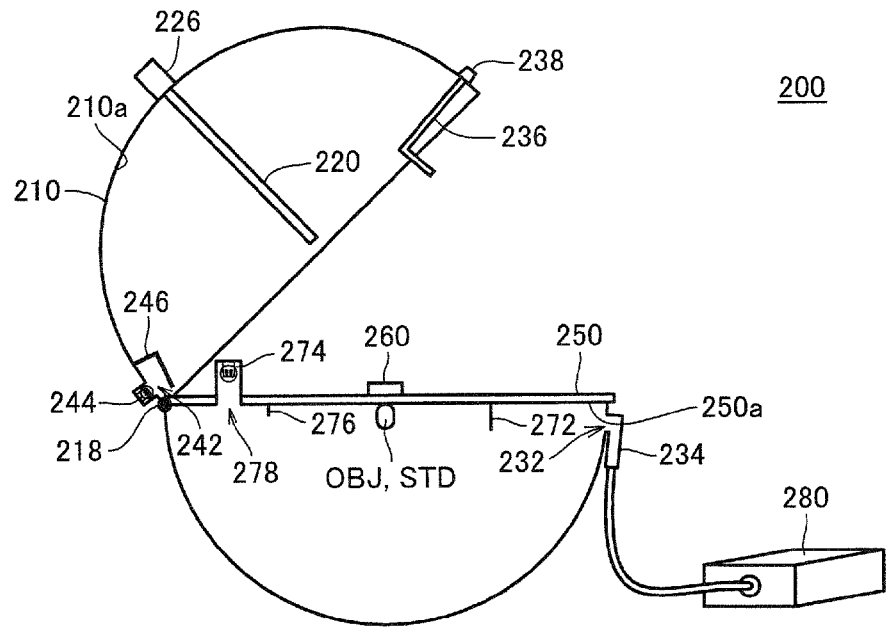
FIG. 12C is a schematic diagram showing the configuration of the optical measurement system according to the second embodiment.

FIGS. 12A to 12C are each a schematic diagram showing a configuration of an optical measurement system 200 according to the second embodiment. Referring to FIG. 12A, optical measurement system 200 includes an integrating sphere 210, a support member 220 and baffles 236 and 246 that are arranged in integrating sphere 210, a photodetector 280, and an auxiliary light source 244.

As shown in FIG. 12B, integrating sphere 210 is constituted of a pair of hemispherical portions coupled in such a manner that enables the hemispherical portions to be opened and closed. Namely, the upper hemispherical portion and the lower hemispherical portion are coupled by a hinge 218 so that the hemispherical portions can be opened and closed. The upper hemispherical portion is moved vertically upward to thereby open integrating sphere 210. When integrating sphere 210 is in the opened state, a mirror plate 250 can be attached to one of the hemispherical portions. FIG. 12C shows optical measurement system 200 in the state where mirror plate 250 is attached.

Namely, in optical measurement system 200 according to the present embodiment, measurement can be performed in the closed state (the state where the pair of hemispherical portions is closed) in which the light source is arranged by means of support member 220 in integrating sphere 210, and measurement can also be performed in the opened state (the state where the pair of hemispherical portions is opened) in which the light source is arranged without the support member in an imaginary integrating sphere formed by mirror plate 250 and one of the hemispherical portions. Thus, mirror plate 250 can be used to selectively implement, in shared optical measurement system 200, both the method for measuring the total luminous flux by means of an integrating sphere similar to the conventional one, and the method for measuring the total luminous flux by means of a hemisphere photometer. In the following, optical measurement system 200 according to the present embodiment will be described in detail.

Referring to FIG. 12A, integrating sphere 210 has a reflecting surface 210a on its inner wall. This reflecting surface 210a is a diffuse reflecting surface formed by application of barium sulfate, PTFE, or the like. Integrating sphere 210 is made up of a pair of hemispherical portions coupled in such a manner that enables the hemispherical portions to be opened and closed, and thus the hemispherical portions have respective reflecting surfaces on their respective inner walls.

Support member 220 serves as a member for lighting the light source at a substantially central position in integrating sphere 210 constituted of the pair of hemispherical portions, in the state where integrating sphere 210 is closed (the state where the pair of hemispherical portions is closed). Support member 220 is fixed to integrating sphere 210 by a fixing member 226.

Baffle 236 and fixing member 238 are similar to baffle 136 and fixing member 138 shown in FIG. 6A, and thus the detailed description thereof will not be repeated. Regarding auxiliary light source 244 as well, it is similar to auxiliary light source 144 shown in FIG. 6A. The light from auxiliary light source 244 is introduced through an auxiliary light source window 242 into integrating sphere 210.

Photodetector 280 is also similar to photodetector 180 shown in FIG. 6A, and thus connected to observation window 232 through an optical fiber 234 processed to be adapted to attachment. Photodetector 280 can thus detect the illuminance on the inner wall of integrating sphere 210.

In contrast, when measurement is to be performed in the state (opened state) shown in FIG. 12B, mirror plate 250 is attached to close the opening of one of the hemispherical portions. Mirror plate 250 is attached to a hemispherical portion (the lower hemispherical portion in the case of FIG. 12B) where observation window 232 is formed to which photodetector 280 is connected through optical fiber 234.

Mirror plate 250 has a reflecting surface 250a on the side which is to face the hemispherical portion (the lower hemispherical portion in the case of FIG. 12B) to which the mirror plate is to be attached. This reflecting surface 250a is a specular reflection surface formed of a metal-vapor-deposited minor (typically aluminum-vapor-deposited mirror) or the like. Preferably this reflecting surface 250a has a sufficiently high reflectance. Reflecting surface 250a may undergo reflectance-enhancement processing to thereby have an increased reflectance.

As shown in FIG. 12C, minor plate 250 can be used to obtain a composite space made up of a real space that is present inside the hemispherical portion and an imaginary space generated by reflecting surface 250a and corresponding to the real space. This composite space corresponds to an imaginary integrating sphere. Accordingly, in this imaginary integrating sphere, only those objects present on the reflecting surface 250a side of mirror plate 250 are included.

Mirror plate 250 further includes a support member 260 for attaching a light source (standard light source STD or sample light source OBJ) to mirror plate 250. Support member 260 is configured to support the light source from the side opposite to reflecting surface 250a of mirror plate 250. Therefore, support member 260 is absent in the above-described imaginary integrating sphere. Support member 260 also supplies electric power for lighting the light source to be attached to minor plate 250.

While FIGS. 12A and 12B show an example of the light source that protrudes inward of the imaginary integrating sphere, a surface light source may also be measured. In this case, an opening that is substantially identical in size to the cross section of sample light source OBJ may be made in a central portion of mirror plate 250 so that sample light source OBJ may be attached to this opening.

Thus, in the state where minor plate 250 is attached to the hemispherical portion, support member 260 allows the light source to be exposed and lit in the hemisphere formed by this hemispherical portion and minor plate 250. The illuminance on the inner wall of the integrating hemisphere generated by lighting of this light source is detected through observation window 232 by photodetector 280. Namely, photodetector 280 detects the light from the light source through observation window 232 formed at the hemispherical portion to which mirror plate 250 is attached. From the illuminance detected by photodetector 280, the total luminous flux emitted from sample light source OBJ is measured.

On the reflecting surface 250a side of mirror plate 250, a baffle 272 is provided for preventing the light from the light source (standard light source STD or sample light source OBJ) from directly irradiating photodetector 280.

Further, in the case where the hemispherical portion to which minor plate 250 is attached does not have auxiliary light source 244 used for introducing, through auxiliary light source window 242, light which is necessary for calculation of the self absorption correction factor, minor plate 250 is provided with an auxiliary light source 274. This auxiliary light source 274 is arranged on the side opposite to reflecting surface 250a of mirror plate 250, so that auxiliary light source 274 is not included in the imaginary integrating sphere. Light from auxiliary light source 274 is introduced into the imaginary integrating sphere through an auxiliary light source window 278 provided in a part of reflecting surface 250a. A baffle 276 is also provided for preventing the light from auxiliary light source 274 from directly irradiating photodetector 280.

As to baffles 272 and 276 provided on reflecting surface 250a of mirror plate 250, the positional relation between the baffles and photodetector 280 is important. In contrast, mirror plate 250 is disk-shaped and therefore can be attached in any positional relation (angle) to the hemispherical portion. In view of this, mirror plate 250 is preferably provided with an arrangement for determining the relative positional relation to the hemispherical portion. As such a determining arrangement, any arrangement may be employed. By way of example, the configuration as shown in FIG. 13 may be employed.

Figure 13:
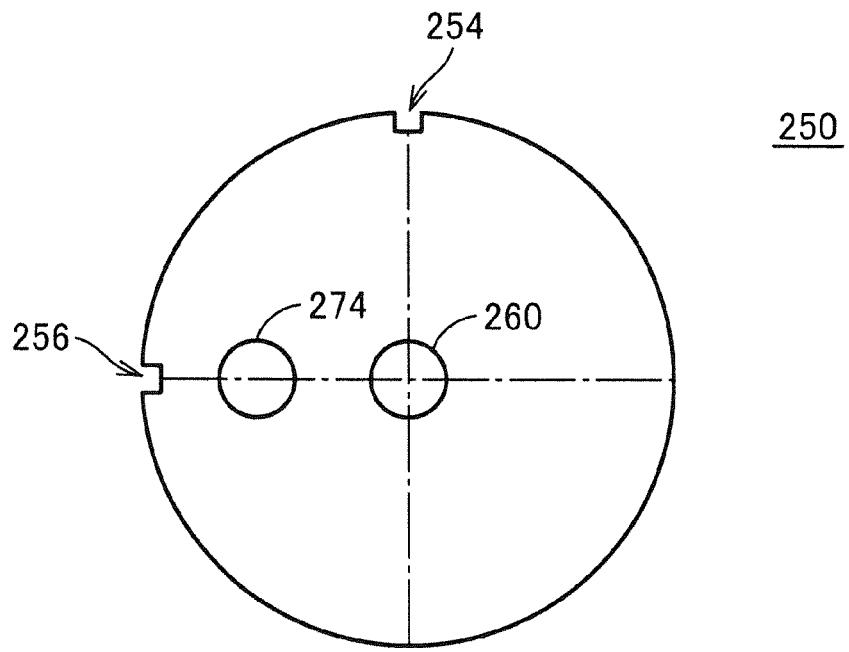
FIG. 13 is a plane view of a minor plate used for the optical measurement system according to the second embodiment.

FIG. 13 is a plane view of mirror plate 250 used for optical measurement system 200 according to the second embodiment. Referring to FIG. 13, mirror plate 250 has the shape of a disk with a diameter that is larger to a certain extent than that of the cross section of the hemispherical portion to which the mirror plate is to be attached. In order to determine the position of minor plate 250 relative to the hemispherical portion, indentations 254 and 256 are formed along a part of the outer perimeter of the minor plate. When the mirror plate is attached to the hemispherical portion, these indentations 254 and 256 engage with protrusions (not shown) respectively that are provided on the hemispherical portion. Accordingly, even if a user does not have deep knowledge about optical measurement system 200 of the present embodiment, the user can utilize the form in use shown in FIG. 12C.

e2: Modification

Mirror plate 250 according to the present embodiment can be adapted to any integrating sphere. For example, some large-sized integrating spheres are configured so that the integrating sphere can be divided along a vertical plane into two sections. In such a case as well, mirror plate 250 can be attached to one of the hemispherical portions to perform measurement similarly to the hemisphere photometer.

Figure 14A:
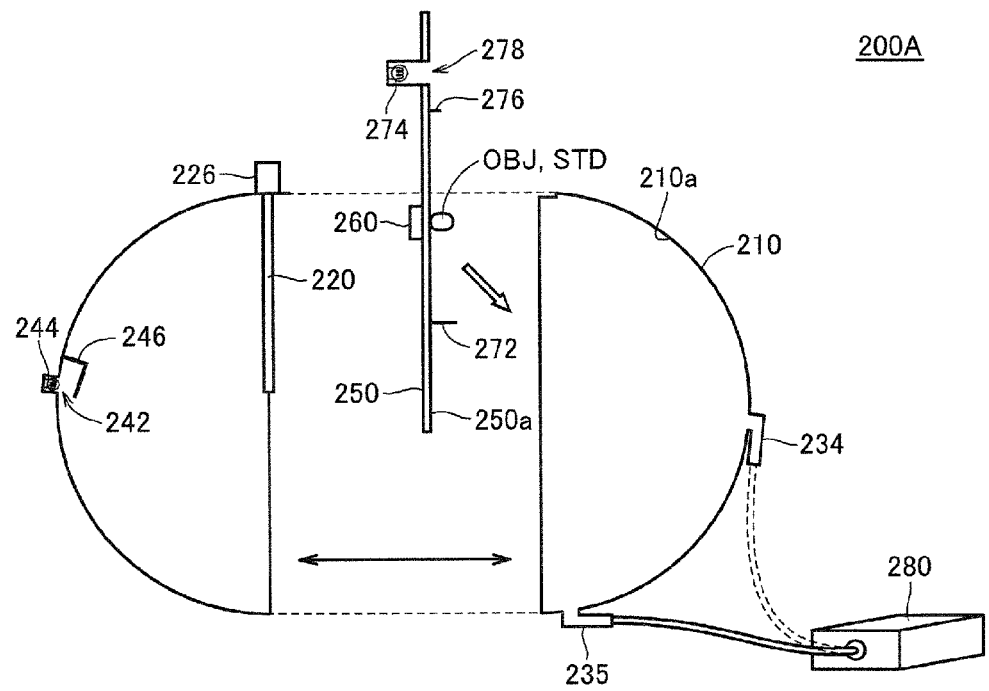
FIG. 14A is a schematic diagram showing a configuration of an optical measurement system according to a first modification of the second embodiment.
Figure 14B:
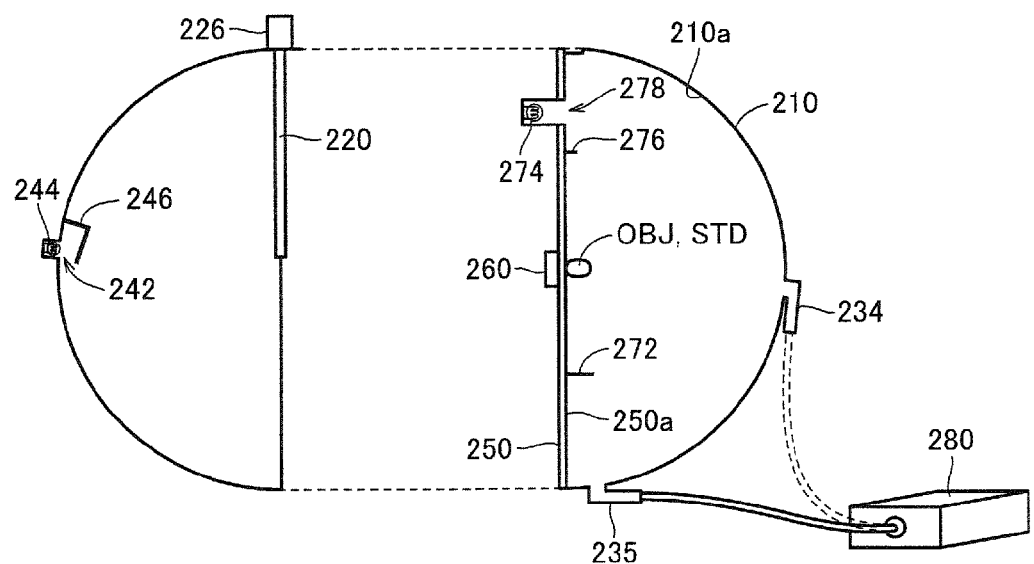
FIG. 14B is a schematic diagram showing the configuration of the optical measurement system according to the first modification of the second embodiment.

FIGS. 14A and 14B are each a schematic diagram showing a configuration of an optical measurement system 200A according to a first modification of the second embodiment. Optical measurement system 200A shown in FIG. 14A is configured so that a pair of hemispherical portions is slidable along the horizontal direction. In such an optical measurement system 200A as well, minor plate 250 can be attached to one of the hemispherical portions to allow the system to function as a hemisphere photometer as shown in FIG. 14B.

The form in use as shown in FIG. 14B is suitable for measurement of a light source used to emit light in the horizontal direction, such as measurement of the total luminous flux of a headlight for a vehicle, for example.

e3: Advantages

In accordance with the above-described second embodiment, even when optical measurement system 200 including the existing integrating sphere is used, mirror plate 250 can be attached to measure the total luminous flux of sample light source OBJ, without a measurement error due to absorption of light by the support member as well as a measurement error due to a difference in luminous intensity distribution between the standard light source and the sample light source. Therefore, even in the case where a hemisphere photometer cannot be newly prepared for financial reasons for example, the total luminous flux can be measured with a similar accuracy to that in the case where the hemisphere photometer is used.

F. Process Procedure

Figure 15:
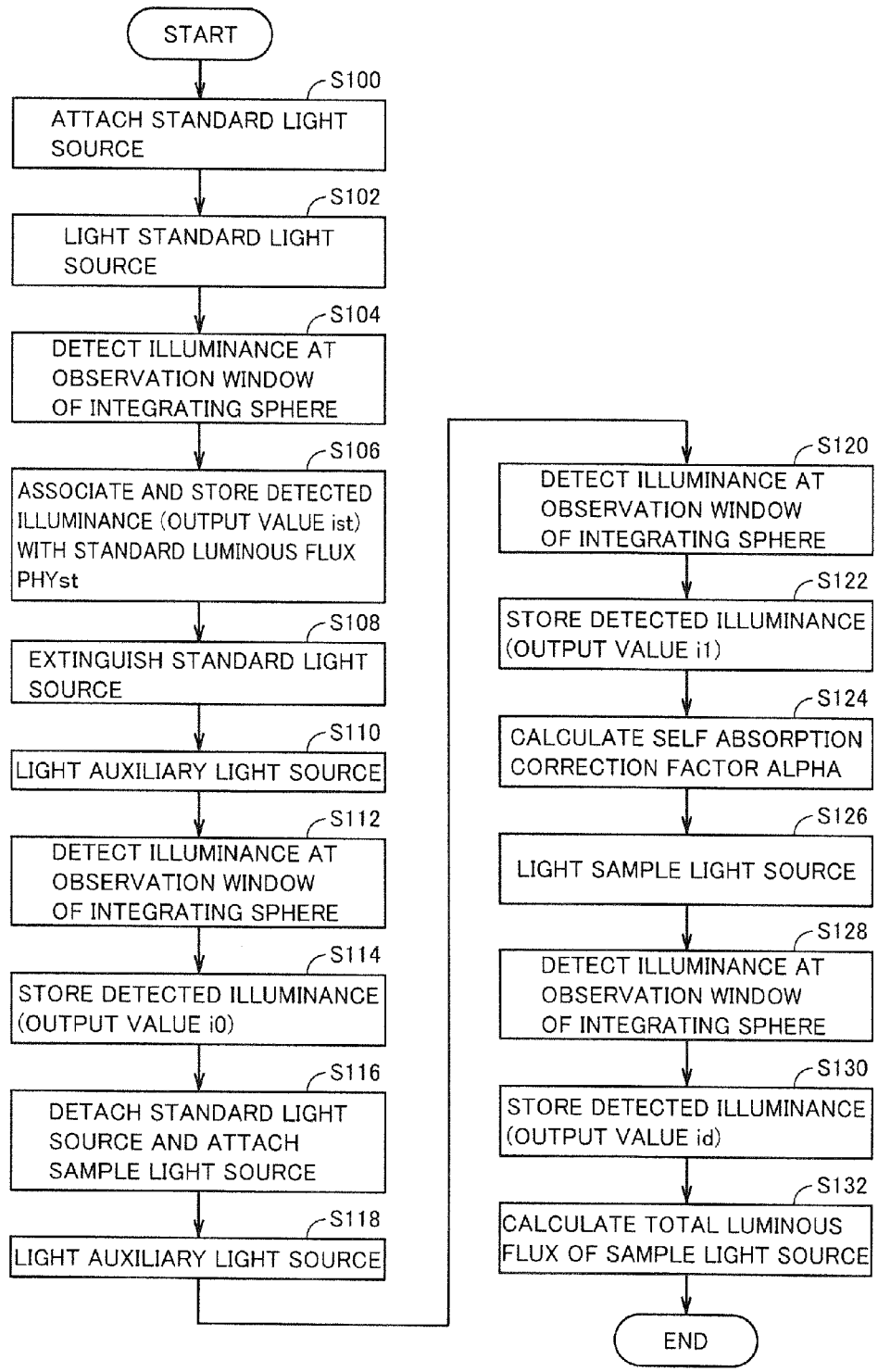
FIG. 15 is a flowchart showing a process procedure for measuring the total luminous flux of a sample light source by means of an optical measurement system according to the embodiments.

A description will next be given of a process procedure followed when the total luminous flux of sample light source OBJ is to be measured with the optical measurement systems according to the first and second embodiments. FIG. 15 is a flowchart showing the process procedure followed to measure the total luminous flux of sample light source OBJ with an optical measurement system according to the embodiments.

Referring to FIG. 15, a user first attaches standard light source STD to the support member (step S100). It is supposed here that the total luminous flux emitted from standard light source STD is a standard luminous flux PHYst. In the case where optical measurement system 100 of the first embodiment is used, standard light source STD is attached to support member 120 in the state shown in FIG. 6A. In the case where optical measurement system 200 of the second embodiment is used, standard light source STD is attached to support member 260 in the state shown in FIG. 12C. Subsequently, standard light source STD is lit (step S102), and the illuminance at the observation window 132 of the integrating sphere is detected with the photodetector (step S104). The illuminance (output value ist) detected with the photodetector is associated with standard luminous flux PHYst and stored (step S106). Through the process from step S102 to step S106, a calibration process by means of standard light source STD is completed. It is noted that a process of correcting for self absorption, which will be described later herein, may also be performed in this calibration process.

Subsequently, the self absorption correction factor for sample light source OBJ is calculated.

Specifically, the user extinguishes standard light source STD (step S108). Namely, standard light source STD is caused to have a non-light-emitting state.

Subsequently, the auxiliary light source is lit (step S110), and the illuminance at observation window 132 of the integrating sphere is detected with the photodetector (step S112). The illuminance (output value i0) detected with the photodetector is stored (step S114). This output value i0 corresponds to the measurement value in the state where self absorption of standard light source STD is involved.

The user then detaches standard light source STD from the support member and attaches sample light source OBJ to the support member (step S116). In the case where optical measurement system 100 of the first embodiment is used, sample light source OBJ is attached to support member 120 in the state shown in FIG. 6A. In the case where optical measurement system 200 of the second embodiment is used, sample light source OBJ is attached to support member 260 in the state shown in FIG. 12C. Subsequently, the auxiliary light source is lit (step S118), and the illuminance at observation window 132 of the integrating sphere is detected with the photodetector (step S120). The illuminance (output value i1) detected with the photodetector is stored (step S122). This output value i1 corresponds to the measurement value in the state where self absorption of sample light source OBJ is involved.

Further, output value i1 is divided by output value i0 to calculate self absorption correction factor ALPHA for sample light source OBJ (step S124).

In this way, the process of calculating the self absorption correction factor for sample light source OBJ is completed. This self absorption correction factor ALPHA means the ratio between the illuminance detected under the condition that standard light source STD is in the non-light-emitting state while auxiliary light source 274 is lit, and the illuminance detected under the condition that sample light source OBJ is in the non-light-emitting state while auxiliary light source 274 is lit.

Subsequently, the auxiliary light source is extinguished (non-light-emitting state), sample light source OBJ is lit (step S126), and the illuminance at the observation window 132 of the integrating sphere is detected with the photodetector (step S128). The illuminance (output value id) detected with the photodetector is stored (step S130).

Finally, based on standard luminous flux PHYst of standard light source STD and corresponding output value ist, self absorption correction factor ALPHA, and output value id, the total luminous flux of sample light source OBJ is calculated (step S132).

Output value ist corresponding to standard light source STD and/or self absorption correction factor ALPHA may be obtained and/or calculated at any timing and/or in any order as required. For example, if a plurality of sample light sources OBJs of the same type have to be measured, output value ist corresponding to standard light source STD and self absorption correction factor ALPHA may be calculated first, and they may be used repeatedly.

G. Other Embodiments

The optical measurement systems according to the above-described first and second embodiments can both be implemented by improving the existing optical measurement system. It is therefore apparent that the scope of the present invention also encompasses such an improved optical measurement system.

It should be construed that embodiments disclosed herein are by way of illustration in all respects, not by way of limitation. It is intended that the scope of the present invention is defined by claims, not by the description above, and encompasses all modifications and variations equivalent in meaning and scope to the claims.

REFERENCE SIGNS LIST 2 hemisphere photometer; 10, 110, 210 integrating sphere; 10a, 50a, 60a, 110a, 210a, 250a reflecting surface; 12, 180, 280 photodetector; 14, 136, 146, 148, 236, 272, 276 baffle; 16, 20, 120, 120A, 120B, 220, 260 support member; 50 hemispherical portion; 60, 250 minor plate; 100, 100A, 100B, 100C, 100D, 100E, 200, 200A optical measurement system; 118, 218 hinge; 122 first member; 124 second member; 126, 138, 226, 238 fixing member; 132, 232 observation window; 134, 234 optical fiber; 142, 242, 278 auxiliary light source window; 144, 244, 274 auxiliary light source; 254, 256 indentation; OBJ sample light source; STD standard light source.

The invention claimed is:

1. An optical measurement system comprising:
   an integrating sphere having a reflecting surface on an inner wall of the integrating sphere and having a first window;
   a support member for supporting a light source at a substantially central position of the integrating sphere;
   a first baffle arranged on a line connecting the first window and the light source supported by the support member; and
   a photodetector physically connected to the integrating sphere about the first window,
   the support member being connected, in a region opposite to the first window with respect to the light source, to the inner wall of the integrating sphere, and
   the first baffle being arranged so that the support member is out of a range of a field of view through the first window of the photodetector.

2. The optical measurement system according to claim 1, wherein
   the integrating sphere has a second window formed at a position different from the first window, and light from an auxiliary light source is introduced into the integrating sphere through the second window, and
   the optical measurement system further comprises a second baffle associated with the light from the auxiliary light source introduced into the integrating sphere from the second window.

3. The optical measurement system according to claim 1, wherein
   the integrating sphere includes a first hemispherical portion and a second hemispherical portion coupled in such a manner that enables the first and second hemispherical portions to be opened and closed.

4. The optical measurement system according to claim 1, wherein
   the photodetector is physically connected to the integrating sphere about the first window by an optical fiber.

5. An optical measurement method comprising:
   arranging a light source supported by a support member, at a substantially central position of an integrating sphere having a reflecting surface on an inner wall of the integrating sphere; and
   detecting light from the light source by a photodetector which is physically connected to the integrating sphere about a first window formed at the integrating sphere,
   a first baffle being arranged on a line connecting the first window and the light source supported by the support member,
   the support member being connected, in a region opposite to the first window with respect to the light source, to the inner wall of the integrating sphere, and
   the first baffle being arranged so that the support member is out of a range of a field of view through the first window of the photodetector.

6. The optical measurement method according to claim 5, wherein
   the step of arranging the light source includes opening a hemispherical portion of the integrating sphere that includes a first hemispherical portion and a second hemispherical portion coupled in such a manner that enables the first and second hemispherical portions to be opened and closed.

7. The optical measurement method according to claim 5, wherein
   the photodetector is physically connected to the integrating sphere about the first window by an optical fiber.

8. An optical measurement system comprising:
   a first hemispherical portion and a second hemispherical portion having respective reflecting surfaces on respective inner walls and coupled in such a manner that enables the first and second hemispherical portions to be opened and closed;
a first support member for lighting, in a state where the first and second hemispherical portions are closed, a light source at a substantially central position in a sphere formed by the first and second hemispherical portions;
a disk-shaped mirror plate attachable, in a state where the first and second hemispherical portions are opened, to cover an opening of the first hemispherical portion, the mirror plate having a reflecting surface which is to face the first hemispherical portion;
a second support member for lighting, in a state where the mirror plate is attached to the first hemispherical portion, the light source exposed in a hemisphere formed by the first hemispherical portion and the mirror plate; and
a photodetector for detecting light from the light source through a window formed at the first hemispherical portion.

9. A mirror plate adapted to an optical measurement system, the optical measurement system including a first hemispherical portion and a second hemispherical portion having respective reflecting surfaces on respective inner walls and coupled in such a manner that enables the first and second hemispherical portions to be opened and closed, and the mirror plate being attachable, in a state where the first and second hemispherical portions are opened, to cover an opening of the first hemispherical portion, the mirror plate comprising:
a reflecting surface which is to face the first hemispherical portion; and
a support member for lighting, in a state where the mirror plate is attached to the first hemispherical portion, a light source exposed in a hemisphere formed by the first hemispherical portion and the mirror plate.

* * * * *